United States Patent
Dunham

(10) Patent No.: US 6,499,414 B2
(45) Date of Patent: *Dec. 31, 2002

(54) SEED METERING SYSTEM WITH IMPROVED WEAR ENHANCEMENT

(75) Inventor: Lisle J. Dunham, Downers Grove, IL (US)

(73) Assignee: Case Corporation, Racine, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/850,472

(22) Filed: May 7, 2001

(65) Prior Publication Data

US 2002/0043201 A1 Apr. 18, 2002

Related U.S. Application Data

(63) Continuation of application No. 09/061,639, filed on Apr. 15, 1998, now Pat. No. 6,247,418.

(51) Int. Cl.$^7$ .................................................. A01C 7/04
(52) U.S. Cl. ........................ 111/174; 221/211; 111/179; 111/185
(58) Field of Search .................................. 111/174, 179, 111/131, 185; 221/211, 278, 66

(56) References Cited

U.S. PATENT DOCUMENTS

| | | | | |
|---|---|---|---|---|
| 3,722,375 A | * | 3/1973 | Sievenpiper | 92/168 |
| 3,888,387 A | * | 6/1975 | Deckler | 221/278 |
| 4,306,509 A | * | 12/1981 | Hassan et al. | 111/34 |
| 4,613,056 A | * | 9/1986 | Olson | 221/211 |
| 4,793,511 A | * | 12/1988 | Ankum et al. | 221/211 |
| 5,170,909 A | * | 12/1992 | Lundie et al. | 221/211 |

OTHER PUBLICATIONS

Monosem Pneumatic Planter Operator's Manual for NG Plus Mounted Planter, 1988.*

* cited by examiner

Primary Examiner—Thomas B. Will
Assistant Examiner—Meredith Petravick

(57) ABSTRACT

A seed metering system includes a first metering member having a first bearing surface and a second metering member having a plurality of seed engaging surfaces adapted to engage seeds and a second bearing surface positioned against the first bearing surface. The second metering member moves relative to the first metering member. At least one depression extends into the second bearing surface opposite the first bearing surface.

46 Claims, 3 Drawing Sheets

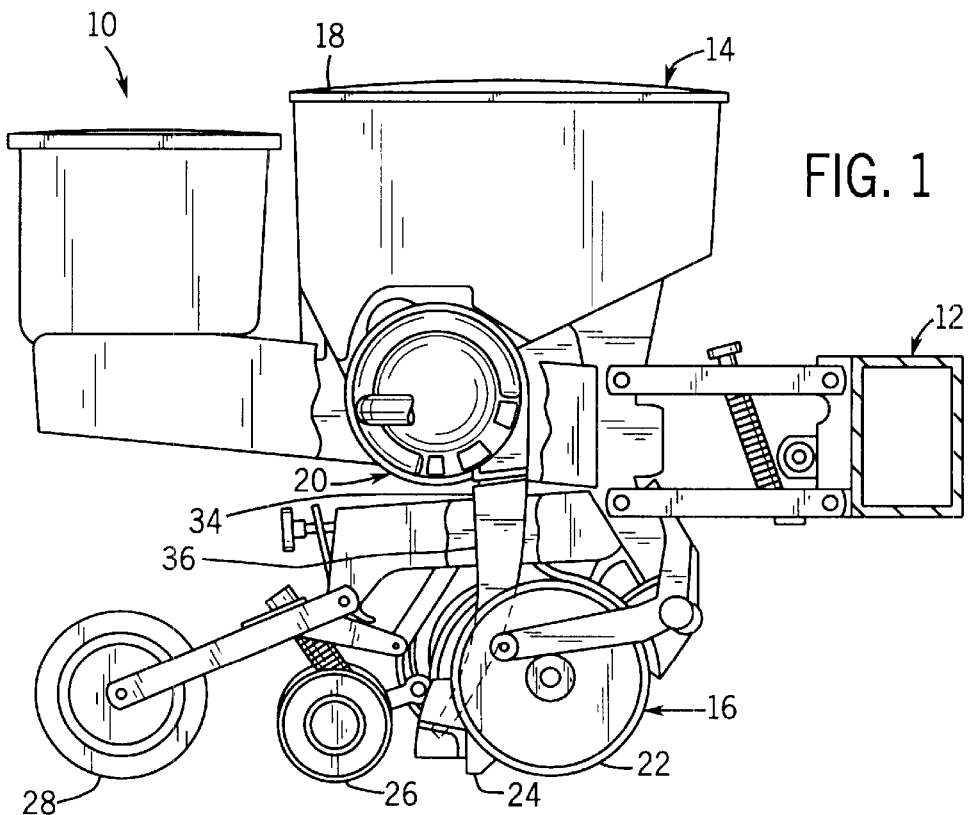
FIG. 1
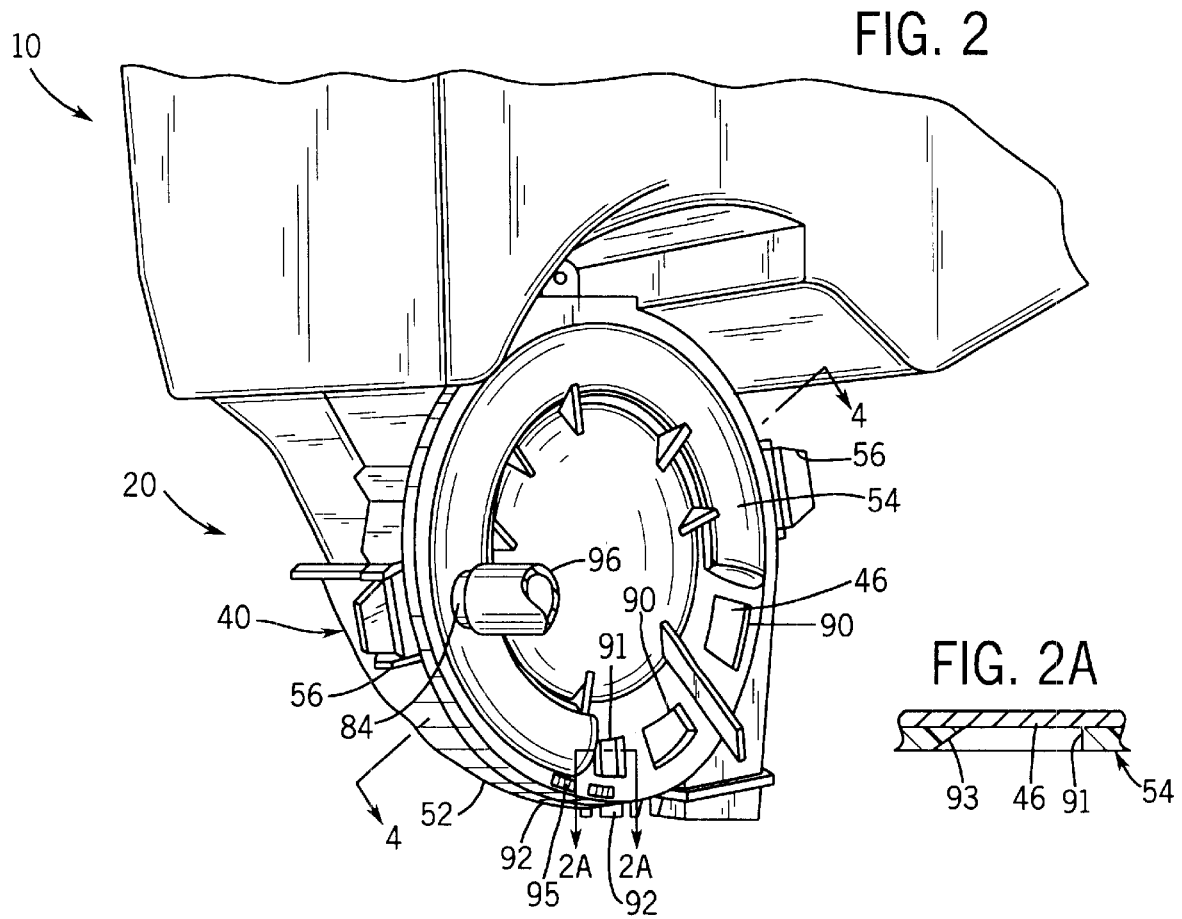
FIG. 2
FIG. 2A

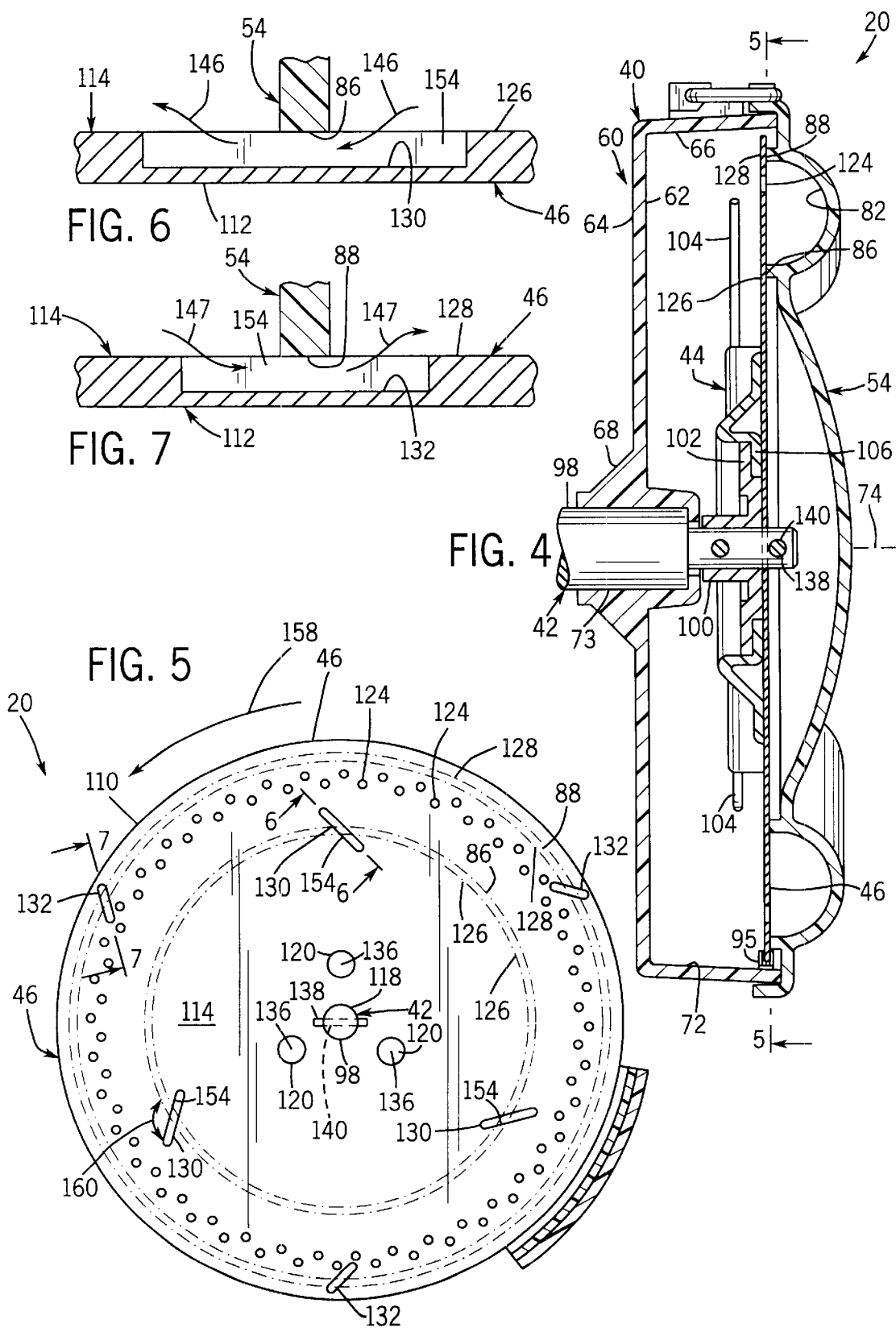

SEED METERING SYSTEM WITH IMPROVED WEAR ENHANCEMENT

CROSS REFERENCE TO RELATED APPLICATIONS

This continuation application claims priority under 35 U.S.C. §120 from co-pending U.S. patent application Ser. No. 09/061,639 filed on Apr. 15, 1998 now U.S. Pat. No. 6,247,418, by Lisle J. Dunham, the full disclosure of which is hereby incorporated by reference.

FIELD OF THE INVENTION

The present invention relates to seed metering systems for dispensing individual seeds at a controlled rate as the seed metering system moves above and along a furrow. In particular, the present invention relates to a seed metering system having first and second metering members which move relative to one another along first and second bearing surfaces, wherein the metering system removes contaminants from between the first and second bearing surfaces to prolong the life of the metering members.

BACKGROUND OF THE INVENTION

Seed meters of various designs have been used for some time to dispense seeds at a controlled rate into a seed furrow as the seed meter is advanced above and along the seed furrow. In a typical arrangement, a tractor is coupled to tow a tool bar to which are attached in a generally parallel, spaced apart relation a plurality of planting units with seed meter arrangement attached thereto. Each planting unit typically includes a seed hopper for containing and carrying a large quantity of seeds to be planted or a smaller container fed from a centralized bin or large hopper, a device for opening a furrow in the ground as the tractor drawn tool bar is advanced across the field over the ground, a seed meter coupled to the seed hopper for dispensing individual seeds into the furrow at a controlled rate, and a further device for moving soil at the sides of the furrow to close the furrow over the seeds.

During a planting operation, the tractor typically moves across the field at speeds of about 4 to about 8 miles per hour. The spacing between adjacent individual seeds in each furrow can be as little as 0.5 inches or less or as much as 10 inches or more depending upon the particular seed being planted. The seed metering mechanism therefore must be capable of dispensing seeds at various rates in the order of 15 to 130 seeds per second or greater as well as at rates which are considerably less.

Some seed metering systems used in planting operations of the type discussed above are of the mechanical type and include a vertical or horizontal seed plate or disc with mechanically actuated fingers or similarly operated mechanical devices for separating individual seeds from the seed disc and then dispensing them into the furrow. While some mechanical seed meters are satisfactory for certain applications, they typically suffer from a number of limitations including the limited speed at which they can accurately dispense seeds, an inability to handle different type seeds without making cumbersome and extensive part changes, and an inherent design complexity which may typically add to the cost, wear and maintenance problems of the mechanically operated seed dispensing systems.

Alternatively, a seed metering mechanism which utilizes an air pressure differential has been developed in an effort to overcome some of the problems of the mechanical seed meters. Air pressure differential seed meters, which are commonly known as air seed meters, are generally of two types: the first type being the positive pressure type and the second type relying upon negative pressure or vacuum.

In the positive pressure type air seed metering mechanism, air is blown into the seed chamber and onto the surface of a rotating or otherwise movable and opening member or disc in order to create an air pressure greater than atmospheric pressure in the chamber. This forces seeds from a seed mass onto the seed member or disc where they are retained for later release. The openings or holes in the rotating member or disc are open to atmosphere, such that the individual seeds are held by the blowing air until the seeds are dispensed by interrupting the flow of air to the seeds.

Vacuum seed metering systems typically include a rotatable disc mounted for rotation within a hollow interior of a generally cylindrical two-piece housing mounted at the bottom of a seed hopper. Seeds from the seed hopper flow into a seed chamber within the housing on a side of the seed disc having a plurality of through openings provided in a circumferential arrangement adjacent the periphery of the disc. As the seed disc rotates, the openings are arranged such that they pass through the seed chamber and the seeds are drawn to the openings and held therewithin as the seed disc rotates. In vacuum seed metering mechanisms, as the seed disc rotates, the seeds are held in relation to the seed disc by a vacuum source coupled to a separate chamber on the opposite side of the seed disc from the seeds in the seed chamber. Because the pressure differential at the seed disc comes from a vacuum source on a side of the disc opposite from the seed chamber, the problem of having to direct an air flow through the seed mass and onto the seed disc is eliminated.

As is conventional, the vacuum communicates with the openings in the seed disc which extend through the thickness of the seed disc. As the individual seeds are carried by the seed disc, they eventually reach a discharge area from whence the seeds are discharged from the seed disc for gravitational deposit into the furrow passing beneath the seed metering mechanism. This is accomplished by isolating the effects of the vacuum or pressure differentials acting on the seed disc in the discharge region or area of the seed metering mechanism.

In vacuum seed metering systems, it is necessary that the vacuum chamber within the housing of the seed metering mechanism be sealed against atmospheric air so that the vacuum acting on the seeds can be confined to a particular path of movement of the openings in the seed disc. This requires sealing of the region between the outer periphery of the disc and the inner radial distance defined by the innermost circular row of openings in the disc. Complicating this requirement is the fact that the seed metering disc rotates at a speed which can be substantial.

Each of the above described seed metering systems includes a first stationary metering member against which a second metering member having a plurality of seed engaging surfaces moves to carry individual seeds from the seed mass. For example, the vertical or horizontal seed plate of mechanical type seed metering systems typically rotates adjacent to the housing or other structure. In positive pressure types air seed metering systems, a drum having openings extending therethrough is typically rotated adjacent to a housing or other structure. With vacuum seed metering systems, a seed disc having openings extending therethrough is rotated adjacent to the housing or other structure.

As a result, the bearing surfaces between the first and second metering members wear over time. This wear of the bearing surfaces accelerates when particles of dirt, seed treatment and other abrasive particles become captured between the first and second bearing surfaces. As the members move or rotate relative to one another, the particles abrade away at the bearing surfaces. As a result, this accelerated wear of the bearing surfaces requires that either the seed disc, the adjacent housing or both members be replaced more frequently.

Various attempts have been made to remove the abrasive materials and thereby prolong the life of the seed disc or abutting housing. One such attempt at removing abrasive materials has been the provision of a notch or cut-out in the small portion of the bearing surface of the adjacent housing. The notch defines a radially extending wall which scrapes material away from the opposing bearing surface. The notch is typically located at a bottom side of the housing such that material removed by the wall falls away from the housing under the force of gravity. Because the wall formed by the notch is radial, gravitational force is the only force applied to the abrasive material to remove the abrasive material from the seed disc. If the abrasive material is further mixed with grease or other sticky substances, the abrasive material will simply cling to the wall and will continue to abrade the rotating seed disc.

Another such attempt has been the provision of triangular depressions in the bearing surface of the cover. The triangular depressions typically have a wide base communicating with the vacuum chamber and narrow peak. One of the plurality of triangular depressions has a peak communicating with atmosphere.

These triangular depressions, alone, have been found to be ineffective at removing abrasive material. First, because the triangular depressions are formed at spaced locations in the bearing surface of the cover, which is stationary, the abrasive materials along substantial portions of the bearing surface of the cover are not removed. Consequently, these abrasive materials remain and continue to abrade both bearing surfaces of the seed disc and the cover. Second, the majority of the triangular depressions only communicate with the vacuum. As a result, such triangular depressions must rely solely upon scraping action to remove abrasive material. Because all the depressions are triangular in shape, removed abrasive material moves along the edge of the triangular depressions towards the peak of the triangular depression and away from the vacuum chamber. Thus, abrasive materials build up within the peak of the triangular depression and remain within the triangular depression to continue to abrade and wear the seed disc.

Thus, there is a continuing need for a seed metering system which effectively reduces abrasive materials between bearing surfaces of the metering members which move relative to one another to prolong the useful life of the metering members.

SUMMARY OF THE INVENTION

The present invention is directed to a seed metering system including a first metering member having a first bearing surface and a second metering member having a plurality of seed engaging surfaces adapted to engage seeds and a second bearing surface positioned against the first bearing surface. The second metering member moves relative to the first metering member and includes at least one depression extending into the second bearing surface opposite the first bearing surface.

According to one aspect of the present invention, the second metering member includes a plurality of depressions extending into the second bearing surface. The plurality of depressions are equidistantly spaced about an axis of rotation. In the most preferred embodiment, the plurality of depressions comprise three depressions spaced 120 degrees apart from one another about the axis.

According to yet another aspect of the present invention, the second member includes a plurality of openings extending therethrough. The openings at least partially define the seed engaging surfaces. The system further includes a vacuum chamber on one side of the second metering member adjacent at least a portion of the plurality of the openings. Preferably, the depression communicates with at least one of the vacuum chamber and atmosphere. In the most preferred embodiment, the depression communicates with both the vacuum chamber and the atmosphere.

According to yet another aspect of the present invention, the depression includes a wall obliquely extending into the second bearing surface. The wall preferably extends in a non-radial direction relative to an axis of rotation of the second metering member. In the most preferred embodiment, the second bearing surface rotates in a first predetermined direction relative to the first bearing surface and the wall extends from the second bearing surface towards the vacuum chamber in a direction so as to form an obtuse angle therebetween facing the vacuum chamber in a second opposite direction. The angle formed between the wall and the second bearing surface is preferably 135 degrees. As a result, the wall scrapes the abrasive material away from the first bearing surface and moves the abrasive material towards the vacuum chamber.

According to yet another aspect of the present invention, the first bearing surface also includes depressions extending into the first bearing surface opposite the second bearing surface. As a result, the abrasive material along the entire length of both the first bearing surface and the second bearing surface is removed.

The present invention is also directed to a seed disc for use with a seed metering system having a first bearing surface. The seed disc includes a plurality of seed engaging surfaces adapted to engage seeds, a second bearing surface adapted to be positioned against the first bearing surface and at least one depression extending into the second bearing surface.

According to one embodiment of the seed disc, the seed disc includes a plurality of depressions extending into the second bearing surface. Preferably, the plurality of depressions are equidistantly spaced from one another about an axis of rotation of the seed disc. According to yet another embodiment of the seed disc, the seed disc includes a plurality of openings extending therethrough. The seed disc additionally includes a third bearing surface. The second bearing surface extends radially inwardly of the openings while the third bearing surface extends radially outwardly of the openings. Each of the second and third bearing surfaces are preferably provided with a plurality of depressions.

The present invention is also directed to a seed metering system including a first metering member, a second metering member and a wall. The first metering member has a first bearing surface. The second metering member includes a plurality of seed engaging surfaces and a second bearing surface positioned against the first bearing surface. The second metering member moves relative to the first metering member. The wall non radially extends from the second bearing surface in a direction oblique to the first bearing surface.

BRIEF DESCRIPTION OF THE DRAWINGS

FIG. 1 is a side elevational view of a planter including a seed metering system of the present invention.

FIG. 2 is an enlarged fragmentary perspective view of the seed metering system of FIG. 1.

FIG. 2A is a sectional view of the seed metering system taken along lines 2A—2A of FIG. 2.

FIG. 4 is a cross-sectional view of the seed metering system taken along lines 4—4.

FIG. 5 is a sectional view of the seed metering system of FIG. 4 taken along lines 5—5.

FIG. 6 is a sectional view of the seed metering system of FIG. 5 taken along lines 6—6.

FIG. 7 is a sectional view of the seed metering system of FIG. 5 taken along lines 7—7.

DETAILED DESCRIPTION OF THE PREFERRED EMBODIMENTS

Figure 3:
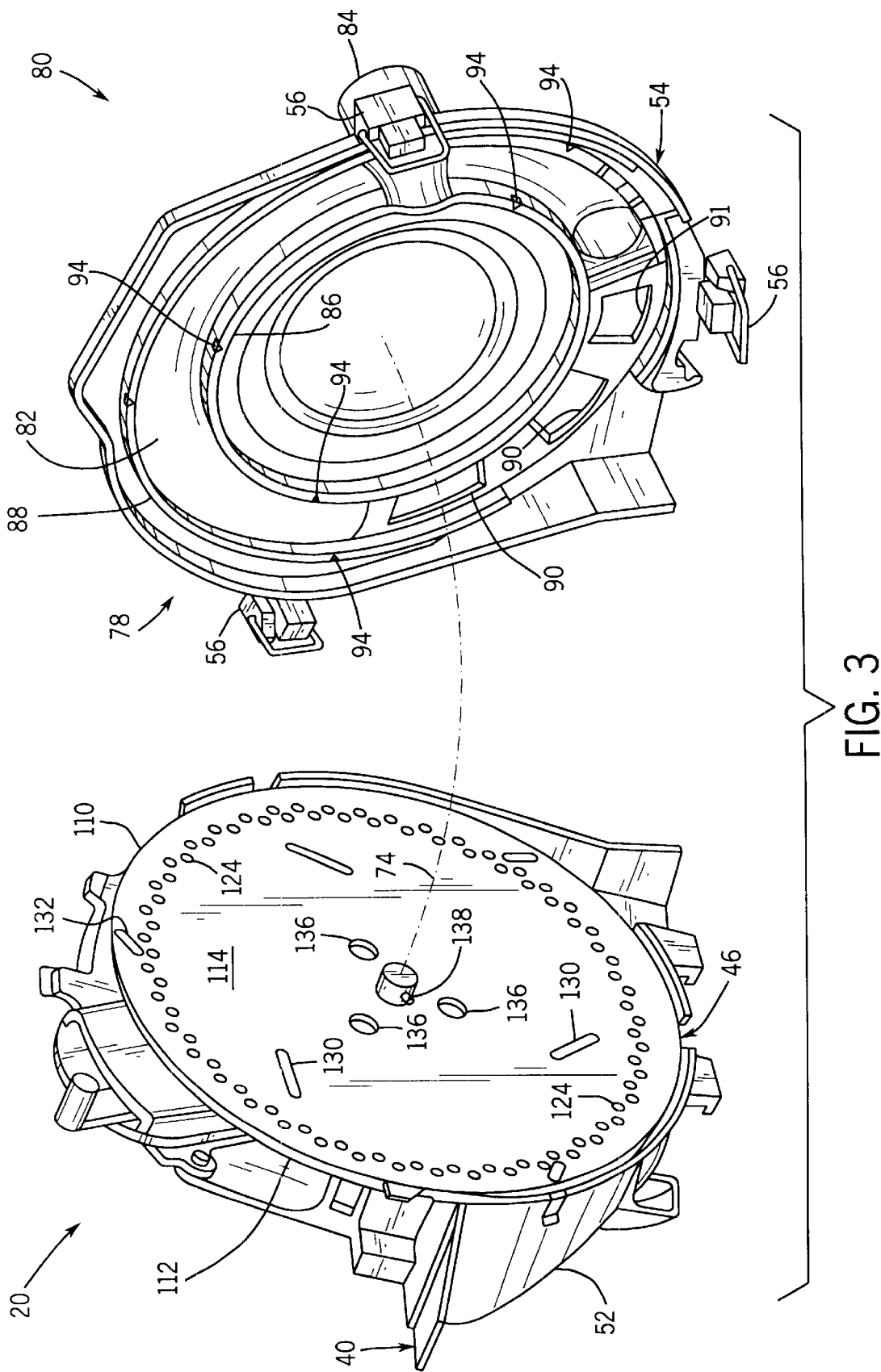
FIG. 3 is a partially exploded perspective view of the seed metering system of FIG. 2.

FIG. 1 is a side elevational view of a system 20 generally including frame 12 and planting units 14. Frame 12 comprises an elongate structure configured to support a plurality of planting units 14 in a side by side relation so as to plant seeds in a plurality of rows. Frame 12 is preferably supported for movement across and over fields by a plurality of wheels (not shown) and is adapted to be towed in a given direction by a vehicle such as a tractor. Alternatively, frame 12 may be adapted for being directly mounted and carried by a vehicle. As will be appreciated, frame 12 may have a variety of different sizes and configurations depending upon the particular configuration and number of planting units 14.

Planting units 14 each generally include furrow unit 16, hopper 18 and seed metering system 20. Furrow unit 16 is conventionally known and includes a pair of laterally spaced furrow opening discs 22, a furrow forming point, an opener shoe 24, furrow closer discs 26 and press wheel 28. Furrow opener discs 22 and opener shoe 24 create a furrow in the ground as system 20 is moved across the field. Once seeds from hopper 18 have been deposited into the furrow by seed metering system 20, furrow closer disc 26 and press wheel 28 close the furrow by covering the planted seed with adjacent soil. As will be appreciated, system 20 may alternatively be provided with any one of a variety of other furrow opening and closing devices such as runner opener types. Moreover, in lieu of furrow unit 16, system 20 may alternatively be provided with other well known arrangements for implanting seeds provided by hopper 18 and seed metering system 20 into the ground or on the ground surface depending upon the type of seed being planted or dispensed.

Hopper 18 generally comprises a container for storing and dispensing seed material to the seed metering system 20. Hopper 18 and its associated lid are essentially described and illustrated in U.S. Pat. No. 6,065,410 filed on Apr. 15, 1998 by Lisle J. Dunham and entitled "Hopper System with Lid", the full disclosure of which is hereby incorporated by reference. As will be appreciated, hopper 18 may have a variety of alternative sizes and configurations depending upon the configuration of seed metering system 20 as well as the size and volume of seed materials being stored. For example, hopper 18 may alternatively be connected to a centralized bin from which seed is provided. Moreover, in lieu of seed metering system 20 being provided with seed from hopper 18, seed metering system 20 of planting unit 14 may be provided with seed from a centralized bin connected to seed metering system 20.

Seed metering system 20 is supported by frame 12 and is configured to receive seed material from hopper 18 and to deliver seed at a controlled rate to the furrow created by furrow unit 16. As shown by FIG. 1, seed metering system 20 preferably includes an elongated seed tube 34 extending to a location between shoe 24 and furrow closer discs 26. Seed tube 34 provides a vertical passage 36 through which seeds are delivered by seed metering system 20 to the ground. In the preferred embodiment illustrated, seed tube 34 is preferably of the type disclosed in U.S. Pat. No. 5,974,988 filed on Dec. 29, 1995, the full disclosure of which is incorporated herein by reference.

During planting, as the vehicle pulls frame 12 across and over the ground, furrow opener discs 16 and shoe 24 create a furrow in the ground. Seeds from hopper 18 flow into seed metering system 20 from which seeds are introduced at a controlled rate into seed tube 34 to uniformly move through the vertical passage 36 defined by tube 34 into the furrow. Once the seeds are deposited into the furrow and into the ground, the furrow closer discs 26 close the furrow together and over the seed. Lastly, press wheel 28 compacts the soil over the planted seeds.

FIGS. 2–4 illustrate seed metering system 20 in greater detail. FIG. 2 is an enlarged perspective view of seed metering system 20. Alternatively, housing assembly 40 and seed plate or disc 46 will be additionally modified pursuant to U.S. Pat. No. 6,109,193 filed on Apr. 15, 1998 by Richard J. Crabb, Guntis Ozers, David N. Slowinski, Chad M. Johnson, Donald Johnson, Lisle J. Dunham, John F. Stufflebeam, Thomas A. Olson, Stephen D. Berry, Thomas Brown and Gerald J. Tiedt entitled "Seed Planter Apparatus and Method", the full disclosure of which is hereby incorporated by reference. FIG. 3 is an exploded perspective view of seed metering system 20. FIG. 4 is a sectional view of seed metering system 20 taken along lines 4—4 of FIG. 2. Seed metering system 20 generally includes split housing assembly 40, drive assembly 42, agitator assembly 44 and seed plate or disc 46. Housing assembly 40 is substantially similar to the housing assembly disclosed and illustrated in U.S. Pat. No. 5,799,598 filed Aug. 20, 1996 and entitled "Apparatus for Sealing a Vacuum Chamber of a Seed Metering Apparatus," the full disclosure of which is hereby incorporated by reference. As shown by FIGS. 2–4, housing assembly 40 generally includes a shell or housing 52 and a shell or cover 54 releasably connected to housing 52. Preferably, cover 54 is releasably secured to housing 52 by a series of manually releasable fasteners 56 which enable cover 54 to be completely removed from housing 52. Fasteners 56 secure cover 54 to housing 52 in a substantially air-tight relationship.

As best shown by FIG. 4, housing 52 includes a generally planar back wall 60 having inner and outer surfaces 62 and 64, respectively, circumferential skirt or rim 66 and annular hub 68. Rim 66 extends along the perimeter of back wall 60 and axially projects from inner surface 62. Rim 66 cooperates and mates with cover 54 to close housing assembly 40. In particular, inner surface 62 of back wall 60, rim 66 and seed disc 46 define a seed reservoir or chamber 72 therebetween in which seeds are stored until being metered by the rotation of seed disc 46.

Hub 68 is formed at the center of housing 52 and axially projects inwardly from inner surface 62. Hub 68 defines a central bore 73 which defines a longitudinal axis 74 for seed metering system 20. Hub 68 rotatably supports and centers drive assembly 42 along axis 74.

Cover 54 is preferably formed as a unitary or one-piece member having an inner side 78 adapted to face housing 52 and seed disc 46 and an opposite outer side 80. Cover 54 generally includes vacuum chamber 82, vacuum port 84, inner bearing surface 86, outer bearing surface 88, openings 90, 91 and cutouts 92. Vacuum chamber 82 is generally configured so as to extend adjacent to openings 124 in seed disc 46 as seed disc 46 lifts and carries seeds. Vacuum chamber 82 is preferably arcuately shaped and extends approximately 270 degrees along an inner periphery of cover 54. Vacuum chamber 82 communicates with suction port 84 and is defined by bearing surfaces 86 and 88. As best shown by FIG. 2, suction port 84 is connected to a flexible conduit 96. Flexible conduit 96 is further connected to a vacuum source (not shown) such that a vacuum or negative pressure is created in chamber 82 when cover 54 is fastened to housing 52. The negative pressure within chamber 82 draws air through openings 124 of seed disc 46 and further maintains seeds against openings 124 of seed disc 46 as the seeds are lifted and carried by seed disc 46 and are deposited into tube 34 (shown in FIG. 1).

Bearing surfaces 86 and 88 provide generally flat surfaces projecting away from inner side 78 of cover 54 so as to abut and contact seed disc 46 on opposite sides of openings 124. As best shown by FIG. 3, bearing surface 86 angularly extends along inner side 78 of cover 54 adjacent vacuum chamber 82. Bearing surface 88 arcuately extends along inner side 78 of cover 54 adjacent an outer perimeter of vacuum chamber 82. As further shown by FIG. 3, bearing surfaces 86 and 88 include triangular shaped recesses or depressions 94 equidistantly positioned along vacuum chamber 82. Depressions 94 are triangular shaped such that depressions 94 are widest adjacent to vacuum chamber 82. Depressions 94 preferably communicate with vacuum chamber 82 but do not completely extend across bearing surface 86 and 88 so as to also communicate with atmosphere. Depressions 94 engage seed disc 46 to remove dirt and debris accumulations on seed disc 46. As best shown by FIG. 4, bearing surface 86 abuts seed disc 46 radially inward of openings 124. Bearing surface 88 engages and abuts seed disc 46 radially outward of openings 124.

Openings 90, 91 extend through cover 54 circumferentially between ends of vacuum chamber 82. Openings 90, 91 enable dirt and other abrasive materials on seed disc 46 to be visually inspected and to fall away from seed disc 46. As best shown by FIG. 2A, opening 91 is bordered by blade 93 formed as part of cover 54 and extending into engagement with seed disc 46. Blade 93 scrapes and removes abrasive material from seed disc 46. The removed abrasive material falls away from seed disc 46 under the force of gravity through opening 91.

Cut-outs 92 extend into a perimeter of cover 54 proximate to brush 95. As best shown by FIG. 4, brush 95 includes bristles which project from housing 52 into engagement with a perimeter of seed disc 46. Brush 95 prevents seed from becoming captured between seed disc 46 and housing 52 or cover 54. Cut-outs 92 enable brush 95 to be visually inspected and also facilitate the removal of abrasive material from between cover 54 and seed disc 46.

Drive assembly 42 axially extends through and is vertically mounted to hub 68 of housing 52. Drive assembly 42 is substantially identical to the drive assembly described and illustrated in U.S. Pat. No. 5,799,598, the complete disclosure of which is hereby incorporated by reference. Alternatively, drive assembly 42 may be further modified from the drive assembly illustrated in U.S. Pat. No. 5,799, 598, to include the coupling system described and illustrated in U.S. Pat. No. 6,003,454 entitled "Automatic Coaxial Engagement Drive Coupler" filed on Apr. 15, 1998 by Guntis Ozers and Joseph A. Michalic, the full disclosure of which is hereby incorporated by reference. As shown in FIG. 4, drive assembly 42 includes driven shaft 98 and rotor 100. Driven shaft 98 is rotatably mounted within bore 73 defined in housing 52 coaxially with axis 74. Driven shaft 98 is mounted to rotor 100. Rotor 100 is identical to the drive rotor illustrated and described in U.S. Pat. No. 5,799,598, the full disclosure of which is hereby incorporated by reference. Rotor 100 mates with agitator assembly 44 and seed disc 46 to rotatably drive agitator assembly 44 and seed disc 46 about axis 74.

Agitator assembly 44 is substantially identical to the agitator assembly described and illustrated in U.S. Pat. No. 5,799,598, the full disclosure of which is incorporated by reference. Agitator assembly 44 generally includes a disc-shaped rotor 102 from which a plurality of flexible fingers 104 radially extend. Rotor 102 includes spring structure 106 which resiliently urges seed disc 46 towards cover 54. Fingers 104 radially extend outward from rotor 102 to agitate the seed mass in housing 52 upon rotation of rotor 102 by driven shaft 98 and drive rotor 100.

Seed disc 46 is a generally circular plate having a perimeter 110, and first and second opposing sides 112 and 114. Seed disc 46 generally includes central opening 118, drive sockets or openings 120, openings 124, inner bearing surface 126, outer bearing surface 128, depressions 130 and depressions 132. Side 112 of seed disc 46 is generally planar or flat and is adapted for being positioned against drive rotor 102 and rotor 102 of agitator assembly 44. Side 114 of seed disc 46 extends opposite side 112. Side 114 is generally planar or flat and is configured for engaging bearing surfaces 86 and 88 of cover 54. Side 114 defines bearing surfaces 126, 128 and depressions 130, 132.

Openings 118 and 120 extend through seed disc 46 from side 112 to side 114. Openings 118 and 120 are preferably sized and configured for receiving drive rotor 102 of drive assembly 42 to nonrotatably couple seed disc 46 to drive assembly 42. In the preferred embodiment illustrated, opening 118 receives an end portion of driven shaft 98 while openings 120 receive pins 136 of drive rotor 102. As a result, seed disc 46 is removably mounted to drive assembly 42 to enable the seed disc to be easily replaced when worn. Seed disc 46 is axially retained on driven shaft 98 and pins 136 by pin 138 extending through bore 140 at an end of shaft 98. As will be appreciated, the size as well as the location of openings 118 and 120 will vary depending upon the size and configuration of the drive assembly to which the seed disc is mounted. Furthermore, in lieu of openings 118 and 120, seed disc 46 may have various other structures or configurations for enabling seed disc 46 to be removably mounted to a correspondingly configured portion of a drive assembly for enabling seed disc 46 to be rotated.

Openings 124 extend through seed disc 46 from side 112 to side 114. Openings 124 are preferably located so as to form two adjacent and concentric rows between bearing surfaces 126 and 128. Openings 124 are located so as to extend adjacent to vacuum chamber 82 of cover 54 when positioned adjacent cover 54. Openings 124 are sized to at least partially receive the seeds stored between housing 52 and seed disc 46 such that the negative pressure within vacuum chamber 82 draws air through openings 124 and maintains a seed against each opening 124 on side 112 of seed disc 46. As will be appreciated, the number of openings 124, the spacing between openings 124 and the exact size and configuration of openings 124 will vary depending upon the type of seed or other material being metered as well as the desired seed spacings.

Bearing surfaces 126, 128 extend along side 114 of seed disc 46. Bearing surfaces 126 and 128 comprise portions of side 114 of seed disc 46 which face and abut bearing surfaces 86 and 88, respectively, of cover 54. In the exemplary embodiment, bearing surfaces 126 and 128 are generally coplanar with the remainder of side 114 of disc 46. Alternatively, bearing surfaces 126 and 128 may axially project away from side 114 towards cover 54 or axially project away from side 114 towards side 112 of disc 46. As best shown by FIG. 5, bearing surfaces 126 and 128 extend adjacent to opposite sides of openings 124. In particular, bearing surface 126 extends radially inward of openings 124. Bearing surface 128 encircles openings 124 and extends radially outward of openings 124. Bearing surfaces 126 and 128 bear against bearing surfaces 86 and 88 to stabilize seed disc 46 between drive rotor 102 of drive assembly 42 and cover 54.

FIGS. 5–7 illustrate depressions 132 and 134 in greater detail. Depressions 130 extend into bearing surface 126 opposite bearing surface 86 of cover 54. As best shown by FIG. 6, depressions 130 preferably comprise elongate, narrow slots which communicate between vacuum chamber 82 having a negative pressure and located on a first side of bearing surface 86 and an exterior of vacuum chamber 82 having an atmospheric pressure and located on a second opposite side of bearing surface 86 of cover 54. As best shown by FIG. 7, depressions 132 also preferably comprise elongate, narrow slots which communicate between vacuum chamber 82 located on the first side of bearing surface 88 and an exterior of vacuum chamber 82 located on a second opposite side of bearing surface 88. Depressions 130 and 132 are preferably sized so as to have a cross-sectional area communicating between vacuum chamber 82 and atmosphere such that air flow through depressions 130 and 132 from atmosphere to the vacuum chamber (as indicated by arrows 146 and 147) is sufficiently high so as to draw dirt and other abrasive materials away from bearing surfaces 86 and 88. The abrasive material vacuumed away from bearing surfaces 86 and 88 by the air flow within depressions 130 and 132 is further drawn into the vacuum chamber 82 where it is ultimately discharged from system 20. In addition to vacuuming abrasive materials away from bearing surfaces 86 and 88, the air flow within depressions 130 and 132 also cool bearing surfaces 86 and 88. The cooling of bearing surfaces 86 and 88 prevents the generally plastic surfaces 86 and 88 from becoming fused to one another during the rotation of seed disc 46 relative to cover 54.

In the preferred embodiment illustrated, depressions 130 and 132 have a U-shaped cross-section with a width of approximately 2.5 millimeters and a depth of approximately 2.1 millimeters. As shown by FIG. 5, seed disc 46 preferably includes three depressions 130 and three depressions 132 equidistantly spaced along bearing surfaces 126, 128 opposite bearing surfaces 86, 88, respectively. As a result, during each revolution of seed disc 46, bearing surfaces 86 and 88 of cover 54 are vacuumed three times to remove dirt and other abrasive materials which would otherwise abrade against bearing surfaces 86, 88 and bearing surfaces 126, 128 during the rotation of seed disc 46. Because depressions 130 and 132 are located in seed disc 46, which is rotated by drive assembly 42, the entire annular bearing surface 86 is cleaned of abrasive materials by air flow passing through depressions 130 and 132.

In addition to vacuuming abrasive materials away from bearing surfaces 86, 88, depressions 130 and 132 also scrape abrasive material away from bearing surfaces 86, 88 to further clean bearing surfaces 86, 88 to prolong the useful life of bearing surfaces 86, 88 and bearing surface 126, 128. As best shown by FIGS. 6–7, depressions 130 and 132 define side walls 154 extending obliquely from side 114 towards side 112 of disc 46. In the exemplary embodiment, side walls 154 perpendicularly extend from side 114 towards side 112. Side walls 154 extend across the entire width of bearing surfaces 86 and 88 so as to abut against and scrape abrasive material away from the entire width of bearing surfaces 86 and 88. As best shown by FIG. 5, side walls 154 of each of depressions 130 and 132 non-radially extend along side 114. As a result, material removed from bearing surfaces 86 and 88 by walls 154 is further moved away from bearing surface 126 and 128. To facilitate the complete removal of abrasive material away from bearing surface 126, wall 154 is preferably oriented so as to move the abrasive material removed from bearing surfaces 86, 88 towards vacuum chamber 82 as seed disc 46 is rotated. In the exemplary embodiment illustrated in FIG. 5, seed disc 46 rotates in a counterclockwise direction as indicated by arrow 158. Each wall 154 is oriented so as to extend towards the vacuum chamber in a direction so as to form an obtuse angle 160 facing vacuum chamber 82 in a direction opposite to the rotational direction of seed disc 46 as indicated by arrow 158. The obtuse angle 160 is preferably approximately 135 degrees. Although less optimum, wall 154 may be oriented at various other obtuse angles so as to move the removed abrasive material towards vacuum chamber 178. By directing removed abrasive material towards vacuum chamber 82 as seed disc 46 is rotated, walls 154 work with, rather than against, the air flow through depressions 130 and 132 to better remove the abrasive materials.

In addition to removing abrasive materials from along bearing surface 86 of cover 54, depressions 130 and 132 also visually indicate the extent of wear which has occurred on seed disc 46. As seed disc 46 rotates against cover 54, bearing surfaces 126 and 128 ultimately become worn away over time. As a result, seed disc 46 must be periodically inspected and replaced to ensure proper functioning of system 20. Similar to grooves in a tire tread, depressions 130 and 132 enable the operator to easily identify the extent of wear which has occurred by visually inspecting or measuring the remaining depth of depressions 130 and 132. In particular, increased wear is indicated by depressions 130 and 132 having a diminishing depth.

Overall, depressions 130 and 132 of seed disc 46 prolong the life of seed disc 46, prolong the life of cover 54 and facilitate timely replacement of seed disc 46 when worn. Because depressions 130 and 132 are formed as part of seed disc 46 which is rotated relative to cover 54, depressions 130 and 132 remove abrasive material trapped between bearing surfaces 86, 88 and bearing surfaces 126, 128, respectively, along the entire interface between cover 54 and seed disc 46. Because cover 54 includes depressions 94 extending into bearing surfaces 86, depressions 94 remove abrasive material from along the entire bearing surfaces 126, 128. At the same time, because depressions 94 do not communicate between vacuum chamber 82 and atmosphere, depressions 94 do not reduce the negative pressure within vacuum chamber 82. Because depressions 130 and 132 further define walls 154 which scrape abrasive material away from bearing surfaces 86, 88 of cover 54 and also move the removed abrasive material towards vacuum chamber 82, bearing surfaces 86 and 88 are better cleaned and the removed abrasive material is completely removed from system 20 by the vacuum source to prevent the abrasive material from contacting and abrading other components of system 20. Because each of depressions 130 and 132 communicate between vacuum chamber 82 and the exterior of vacuum chamber 82, which is at atmospheric pressure, abrasive material is vacuumed away from bearing surfaces 86 and 88 by air drawn from atmosphere depressions 130 and 132 into vacuum chamber 82. In addition to prolonging the useful life of seed disc 46 as well as cover 54, depressions 130 and 132 also enable the operator to visually determine the extent of wear of seed disc 46 by inspecting the depth of depressions 130 and 132.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A seed metering system comprising:
    a first metering member having a first bearing surface;
    a second metering member having a first side including a plurality of seed engaging surfaces adapted to engage seeds and a second opposite side including a second bearing surface positioned against the first bearing surface, wherein the first and second metering members move relative to one another; and
    at least one depression extending into the second bearing surface;
    wherein the second bearing surface is formed from a material that wears as the first and second bearing surfaces move relative to one another and wherein the at least one depression extending into the second bearing surface has a decreasing depth as a result of the second bearing surface becoming worn to indicate a degree to which the second bearing surface has become worn.

2. The system of claim 1 including a plurality of depressions extending into the second bearing surface opposite the first bearing surface.

3. The system of claim 1 wherein the first and second members are moved relative to one another about an axis of rotation.

4. The system of claim 3 wherein the first and second bearing surfaces circumferentially extend about the axis.

5. The system of claim 4 including a plurality of depressions extending into the second bearing surface opposite the first bearing surface.

6. The system of claim 5 wherein the plurality of depressions are equidistantly spaced about the axis.

7. The system of claim 6 wherein the plurality of depressions comprise three depressions spaced 120 degrees apart from one another about the axis.

8. The system of claim 4 wherein the first and second bearing surfaces extend radially outwardly of the seed engaging surfaces.

9. The system of claim 8 wherein the first metering member includes a third bearing surface and wherein the second metering member includes a fourth bearing surface positioned against the first bearing surface, wherein the third and fourth bearing surfaces extend radially inwardly of the seed engaging surfaces.

10. The system of claim 9 including at least one depression extending into of the fourth bearing surface opposite the third bearing surface.

11. The system of claim 10 including a plurality of depressions extending into at the fourth bearing surface.

12. The system of claim 11 wherein the plurality of depressions extending into the fourth bearing surfaces are equidistantly spaced from one another.

13. The system of claim 4 including a plurality of openings extending through the second member, wherein the openings at least partially define the seed engaging surfaces.

14. The system of claim 13 including a vacuum chamber on one side of the second metering member adjacent at least a portion of the plurality of openings, wherein said at least one depression communicates with at least one of the vacuum chamber and atmosphere.

15. The system of claim 14 wherein said at least one depression communicates with both the vacuum chamber and atmosphere.

16. The system of claim 4 wherein said at least one depression includes a wall extending into the second bearing surface.

17. The system of claim 16 wherein the wall perpendicularly extends into said one of the first and second bearing surfaces.

18. The system of claim 16 wherein the wall extends in a non-radial direction relative to the axis.

19. The system of claim 14, wherein the depression includes a wall extending into the second bearing surface, wherein the second bearing surface rotates in a first predetermined direction relative to the first bearing surface and wherein the wall extends from the second bearing surface towards the vacuum chamber in a direction so as to form an obtuse angle therebetween facing the vacuum chamber in a second opposite direction.

20. The system of claim 19, wherein the obtuse angle forms between the wall and the second bearing surfaces is approximately 135 degrees.

21. The system of claim 14 wherein the first and second bearing surfaces extend radially inwardly of the vacuum chamber.

22. The system of claim 14 wherein the first and second bearing surfaces extend radially outwardly of the vacuum chamber.

23. The system of claim 22 wherein the first metering member includes a third bearing surface, wherein the second metering member includes a fourth bearing surface positioned against the third bearing surface, the third and fourth bearing surfaces extending radially inwardly of the vacuum chamber.

24. The system of claim 23 including at least one depression extending into the fourth bearing surface opposite the third bearing surface.

25. The system of claim 22 including a plurality of depressions extending into the fourth bearing surfaces.

26. The system of claim 25 wherein the plurality of depressions are equidistantly spaced from one another about the axis.

27. The system of claim 1 wherein at least one of the first and second bearing surfaces are formed from a material chosen from the class comprised of:
    thermoplastic elastomers or a nylon material with antistat and low friction agents added thereto.

28. The system of claim 1 wherein the first and second bearing surfaces are resiliently urged towards one another.

29. A seed disc for use with a seed metering system having a first bearing surface, the seed disc comprising:
    a disc member including:
    a first side including a plurality of seed engaging surfaces adapted to engage seeds;

a second opposite side including a second bearing surface adapted to be positioned against the first bearing surface; and at least one depression extending into the second bearing surface;

wherein the second bearing surface is formed from a material that wears as the first and second bearing surfaces move relative to one another and wherein the at least one depression extending into the second bearing surface has a decreasing depth as a result of the second bearing surface becoming worn to indicate a degree to which the second bearing surface has become worn.

30. The seed disc of claim 29 including a plurality of depressions extending into the second bearing surface.

31. The seed disc of claim 30 wherein the seed disc is adapted for rotation about an axis and wherein the plurality of depressions are equidistantly spaced from one another about the axis.

32. The seed disc of claim 29 wherein the disc member is adapted for being rotated about an axis and wherein the second bearing surface extends radially outwardly of the plurality of seed engaging surfaces.

33. The seed disc of claim 32 wherein the seed metering system has a third bearing surface and wherein the seed disc includes a fourth bearing surface adapted to be positioned against the third bearing surface, wherein the fourth bearing surface extends radially inwardly of the plurality of seed engaging surfaces.

34. The seed disc of claim 33 including at least one depression extending into the fourth bearing surface.

35. The seed disc of claim 29 including a plurality of openings extending through the seed disc, wherein the plurality of openings at least partially define the plurality of seed engaging surfaces.

36. The seed disc of claim 33 wherein the metering system includes a vacuum chamber adapted to be positioned adjacent to the plurality of openings and wherein said at least one depression communicates with at least one of the vacuum chamber and atmosphere.

37. The seed disc of claim 34 wherein said at least one depression communicates between the vacuum chamber and atmosphere.

38. The seed disc of claim 29 wherein the seed disc is adapted to rotate about an axis and wherein the depression includes a wall obliquely extending into the second bearing surface and non-radially extends along the second bearing surface.

39. The seed disc of claim 36 wherein the seed disc is adapted to rotate about an axis in a first predetermined direction, wherein said at least one depression includes a wall obliquely extending into the second bearing surface, wherein the wall extends from the second bearing surface towards the vacuum chamber in a direction so as to form an obtuse angle therebetween facing the vacuum chamber in a second opposite direction.

40. The seed disc of claim 39 wherein the obtuse angle formed between the wall and the bearing surface is approximately 135 degrees.

41. The seed disc of claim 38 wherein the wall extends perpendicular to the second bearing surface.

42. The seed disc of claim 29 wherein the second bearing surface is made of a material and is configured so as to form a seal against the first bearing surface.

43. The seed disc of claim 29 wherein the second bearing surface is formed from a material chosen from the class comprised of:

thermoplastic elastomers, polymers or a nylon material with antistat and low friction agents added thereto.

44. A seed metering system including:

a first metering member having a first bearing surface;

a second metering member including a plurality of seed engaging surfaces for engaging seeds and a second bearing surface opposite the plurality of seed engaging surfaces and positioned against the first bearing surface, wherein the second metering member moves relative to the first metering member; and a wall extending from the second bearing surface in a direction towards the first bearing surface;

wherein the second bearing surface is formed from a material that wears as the first and second bearing surfaces move relative to one another and wherein the at least one depression extending into the second bearing surface has a decreasing depth as a result of the second bearing surface becoming worn to indicate a degree to which the second bearing surface has become worn.

45. The seed metering system of claim 44 wherein the wall extends in a direction perpendicular to the other of the first and second bearing surfaces.

46. A planter comprising:

a frame;

a furrow opening unit supported by the frame;

a hopper supported by the frame; and a seed metering system supported by the frame so as to meter seeds from the hopper to a furrow created by the furrow opening unit, the seed metering system including:

a housing;

a cover adjacent to housing; and a seed disc having a plurality of openings extending therethrough and rotatably supported between the housing and the cover, wherein the housing and the seed disc form a seed chamber in communication with the hopper on a first side of the seed disc and a vacuum chamber on a second opposite side of the seed disc adjacent at least a portion of the plurality of openings, wherein the cover and the seed disc abut one another along the first and second bearing surfaces, respectively, and wherein the seed disc includes at least one depression extending into the second bearing surface, whereby the depression facilitates removal of contaminants from between the first and second bearing surfaces;

wherein the second bearing surface is formed from a material that wears as the first and second bearing surfaces move relative to one another and wherein the at least one depression extending into the second bearing surface has a decreasing depth as a result of the second bearing surface worn to indicate a degree to which the second bearing surface has become worn.

* * * * *